United States Patent [19]

Carmack et al.

[11] Patent Number: 5,018,546
[45] Date of Patent: May 28, 1991

[54] FUEL SUPPLY DETACHABLE COUPLING

[75] Inventors: Paul D. Carmack, Tipp City; James A. Asbury, Covington, both of Ohio; Leonard R. Nitzberg, Knoxville, Tenn.

[73] Assignee: Helix Enterprises, Inc., Knoxville, Tenn.

[21] Appl. No.: 597,886

[22] Filed: Oct. 15, 1990

[51] Int. Cl.⁵ .............................................. F16L 37/28
[52] U.S. Cl. .............................. 137/68.1; 137/614.04; 285/1; 285/2
[58] Field of Search .......................... 137/614.04, 68.1; 285/1, 2

[56] References Cited

U.S. PATENT DOCUMENTS

| 2,514,717 | 7/1950 | Power | 285/1 |
|---|---|---|---|
| 3,383,122 | 5/1968 | Richardson | 285/1 |
| 4,269,226 | 5/1981 | Allread | 285/1 |
| 4,779,638 | 10/1988 | Nitzberg et al. | 137/68.1 |
| 4,791,961 | 12/1988 | Nitzberg et al. | 285/1 |
| 4,800,913 | 1/1989 | Nitzberg et al. | 285/1 |
| 4,827,960 | 5/1989 | Nitzberg et al. | 137/68.1 |
| 4,827,961 | 2/1989 | Nitzberg et al. | 137/68.1 |

Primary Examiner—A. Michael Chambers
Attorney, Agent, or Firm—Alan Ruderman

[57] ABSTRACT

A fluid coupling having a pair of body members having fluid passageways through which fluid may flow through an inlet in one of the body members and out an outlet in the other member. One of the body members is connected in flow communication with a flexible hose, and the other body member is connected in flow communication to a rigid conduit by a connecting member about which the body members may rotate relative to a swivel axis. Valving shuts flow communication through the body members when they uncouple. If the excessive tensile force is axially applied through the hose to the coupling, the body members uncouple by pulling apart in the direction along the line of action of the force, but if the excessive tensile force is non-axially applied, the body members, if they cannot be aligned with the axial force vector to uncouple, will be uncoupled by a twisting action resulting from the bending load caused by the force. The uncoupling due to the twisting action in several embodiments is aided by abutment members acting to provide a mechanical advantage to redirect and magnify the force into the axial direction. In other embodiments the uncoupling is the result of the failure of one or more frangible elements which fails as a result of excessive bending or twisting forces. The coupling is utilized in the fuel dispensing line at a fuel dispensing station, such station having either a fuel supply system or a fuel supply with a vapor return system.

39 Claims, 4 Drawing Sheets

FUEL SUPPLY DETACHABLE COUPLING

BACKGROUND OF THE INVENTION

This invention relates to a fluid line detachable coupling for uncoupling and shutting flow of the fluid through the line when a tensile force above a predetermined limit is applied to the coupling in substantially any direction, and more particularly to a coupling for mounting in a fuel supply line of a fuel dispensing station for communicating a first fuel conduit rotatable about a first axis at one end of the coupling to a flexible fuel conduit attached to a second end of the coupling, the coupling having detachable means intermediate the first and second ends permitting uncoupling to shut flow communication at the coupling when the tensile load in the flexible conduit is above a predetermined level irrespective of the direction of the load relative to the first end, i.e., the coupling disconnects when an excessive external tensile load is applied through the flexible conduit at the second end.

It is known in the fuel dispensing art to include a swivel connector at the dispenser/hose interface so that twisting loads applied to the dispenser are not transmitted to the hose resulting in twisting thereof. Such swivels merely permit the dispenser, such as a fuel dispensing nozzle, to be pivoted about one or more axes relative to the axis of the hose, the swivel permitting flow communication between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are actuated by a tensile force in the line.

In U.S. Pat. No. 4,779,638 of Nitzberg et al, the problems and deficiencies of the prior art decoupler units were described including that of premature uncoupling, snap decoupling, and the cumulative affect of tensile force on the line and the hydrostatic forces of the liquid within the coupling, and combination swivel-joint and quick-disconnect coupling devices are disclosed that substantially overcome these problems. The devices there have coupling means between first and second body members which swivel relatively to one another and the coupling means normally acts to connect the body members in flow communication and to decouple when an external tensile force above a predetermined level is applied to the fuel line, and include valving acting for shutting flow communication when the body members are decoupled.

There are, however, certain occasions when the direction of the external tensile force applied to the fuel line is such that both in conventional swivel connectors and in the combination swivel-joint quick-disconnect couplings or connectors disclosed in the aforesaid U.S. Patent where the tensile force will not permit the swivel-joint to pivot, i.e., the reaction force to the external tensile force does not act in a direction which effects rotation about the pivot axis. Such conditions may occur when a swivel-joint having one end connected to a flexible fuel conduit, such as a hose, and the other end connected to a rigid fluid conduit, such as a nozzle or rigidly mounted piping, does not permit the end connected to the flexible conduit to align itself with the direction in which the tensile force is applied. When this occurs a bending moment results which may act to shear the interconnecting members of the joint. For example, if the external tensile force is applied in the same plane as that of the pivot axis of the swivel joint and of the axes of the inlet and outlet to the swivel joint, the reaction to that force can only be resisted by the interconnecting members of the joint, and if the force is substantial a shearing of the elements may occur. In U.S. Pat. No. 4,791,961 of Nitzberg et al, a swivel-joint coupling is disclosed which substantially overcomes this problem by providing a two-axis swivel coupling having the longitudinal axis of the swivel joint and the end thereof connected to the flexible conduit offset relative to a plane parallel to one of the swivel axes and passing through the other so that the coupling could align the longitudinal axis of the end connected to the flexible conduit with the direction of any tensile force applied through the flexible conduit. The longitudinal axis at the connecting member with the flexible conduit is there disposed such that it is always offset from that plane which passes through the first swivel axis and is parallel to the second swivel axis.

Variations of these concepts are provided in Nitzberg et al U.S. Pat. No. 4,800,913 which provides a spherical swivel connector with detachable means, and Nitzberg et al U.S. Pat. No. 4,827,961 which provides a swivel-joint breakaway coupling having a passageway for maintaining laminer flow therethrough at high fuel flow rates. A swivel breakaway suitable for use with dual passage coaxial systems, i.e., those having a vapor return system for drawing off and returning the vapors to the storage tank while fuel is dispensed is disclosed in Nitzberg et al U.S. Pat. No. 4,827,960.

The self aligning features disclosed in the aforesaid Nitzberg et al U.S. Pat. No. 4,791,961 properly disconnects by permitting alignment of the end connected to the flexible conduit with the direction in which the tensile force is applied, but until such alignment occurs the interconnecting members resist the load so that the interaction of the forces on the interconnecting members results in wear. This problem is addressed in Nitzberg copending U.S. application Ser. No. 517,909 filed May 2, 1990, which provides a containment member for resisting the bending loads resulting from the tensile force before alignment occurs. Additionally, when breakaway swivel couplings of this type are not mounted at the preferred location adjacent to the nozzle, but is mounted to the rigid piping at the dispenser with the hose hanging therefrom not only does wear increase at the points of flexure, e.g., the mortise and tenon interconnecting members, but because of the weight of the hose acting on the coupling, an additional frictional resistance to self alignment results which may not only increase wear on the elements, but prevent self alignment to the tensile forces thereby retarding or even preventing uncoupling. This potential problem is intensified when the fuel dispensing system includes vapor recovery so that there is a coaxial assembly. The weight and lack of rigidity of coaxial vapor recovery hoses which have very soft and pliable outer conduit structures, and increased fluid seals and size, may not always result in self alignment of the coupling to tensile forces when mounted at a high position adjacent the fuel dispenser cabinet with the hose hanging therefrom. However, because of air pollution concerns, many states and local governments have mandated such vapor recovery systems.

Fire codes and other regulations presently adopted in regard to gasoline fuels mandate the use of a safety disconnect somewhere in the hose assemblies. As these codes are adopted in those areas requiring vapor recovery systems another problem evolves. The addition of the disconnect can add up to one foot to the overall length of the supply line from the dispenser to the nozzle, and even in the case of the apparatus disclosed in the aforesaid U.S. Pat. No. 4,827,960, in its extended position adds five inches to the overall assembly length. Because of this the hose can engage the ground adjacent the dispenser when the nozzle is returned to the dispenser. Regulations, however, provide that the total length of the hose assembly cannot permit the hose to contact the cement ground surface in the inoperative position since the hose would then wear out rapidly, a problem which is obviously significant from a safety standpoint with the soft outer surface coaxial hose assemblies. Since presently the hoses are manufactured in a standard size, modification of the hose size to accommodate the additional length resulting from the utilization of the coupling device, would add additional cost to the system.

SUMMARY OF THE INVENTION

Consequently, it is a primary object of the present invention to provide a fluid swivel joint coupling having means at one end connected to a flexible conduit and means at the other end connected to a rigid conduit, the coupling having interconnectable members detachably connected together for uncoupling when a tensile load at the joint applied in any direction through the flexible conduit is above a predetermined excessive amount.

It is another object of the present invention to provide a fluid swivel joint coupling having means at one end connected to a flexible conduit and means at the other end connected to a rigid conduit, the coupling having detachable members for uncoupling when the tensile force in the uncoupling direction is above a predetermined level and which has means for permitting uncoupling when the tensile force in other directions is above a predetermined level.

It is a further object of the present invention to provide a fuel line swivel joint connector having a quick disconnectable coupling that may be utilized in conjunction with fuel dispensing systems having soft hoses connected to one end of the connector and having the other end connected to a rigid conduit at the fuel dispenser.

It is a still further object of the present invention to provide a fluid swivel joint coupling having means at one end connected to a flexible hose and means at the other end connected to a rigid conduit mounted at a fuel dispenser, the coupling having means which does not alter the effective length of the hose between the coupling and a fuel nozzle at the other end of the hose when the nozzle is in a stored position on the dispenser.

It is yet a still further object of the present invention to provide a fluid swivel joint coupling having means at one end connected to a flexible hose and means at the other end connected to a rigid conduit, the coupling having mortise and tenon members detachably connected together, the coupling being capable of aligning with the tensile forces applied through the flexible hose for resisting bending loads about the mortise and tenon until the bending loads are excessive, and camming means for forcibly separating the mortise and tenon connection when the bending loads exceed a predetermined amount.

Accordingly, the present invention provides a fluid coupling having a swivel axis about which the coupling may rotate, the coupling being connected to a rigid conduit at one end and a flexible hose at the other end, and having detachably connected members which uncouple as a result of an excessive axial tensile force applied through the hose to the coupling or uncouple when the tensile force is non-axial but effects a bending load on the coupling above a predetermined amount. In certain instances the non-axial force will result in the coupling rotating about the swivel axis to realign the coupling with the axial direction of the force through the hose and if the force is excessive the members will uncouple. In other instances the non-axial force may create a bending moment which will not align the coupling with the axial direction of the force through the hose thereby resulting in bending and/or twisting forces on the coupling and, if these forces are excessive, the members will uncouple by the action of means provided for this purpose.

Thus, the invention provides a fluid coupling having a pair of body members rotatable about a swivel axis, the body members each having a fluid passageway for ingress and egress of fluid through an inlet in one of the members and out of an outlet in the other of the members. One of the body members is connected in flow communication with a flexible hose, and the other body member is connected in flow communication to a rigid conduit preferably by a connecting member relative to which the body members may rotate about the swivel axis. The body members are provided with releasable means, either frangible or infrangible, and may uncouple and separate when the tensile force on the hose exceeds predetermined limits. Valving shuts flow communication through the body members when they uncouple. If the excessive tensile force is axially applied through the hose to the coupling the body members uncouple by pulling apart in the direction along the line of action of the force, but if the excessive tensile force is non-axially applied, the body members, if they cannot be aligned with the axial force vector to uncouple, will be uncoupled by a twisting action resulting from the bending load caused by the force. In the latter case in several embodiments the uncoupling is aided by camming or wedging means acting to provide a mechanical advantage to magnify and redirect the force in the axial direction, while in other embodiments the releasable means includes a plurality of release members, one of which fails as a result of excessive bending forces.

The intended environment of the coupling is in the fuel dispensing line at a fuel dispensing station and the coupling may be configured for a single fluid system, i.e., fuel, or may be configured for a dual fuel system, i.e., fuel with a vapor return. The coupling is specifically constructed for use at the dispenser of such stations, to be connected between rigid piping at the dispenser and a hose, although at least one embodiment may be utilized between the hose and a fuel dispensing nozzle.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

Figure 1:
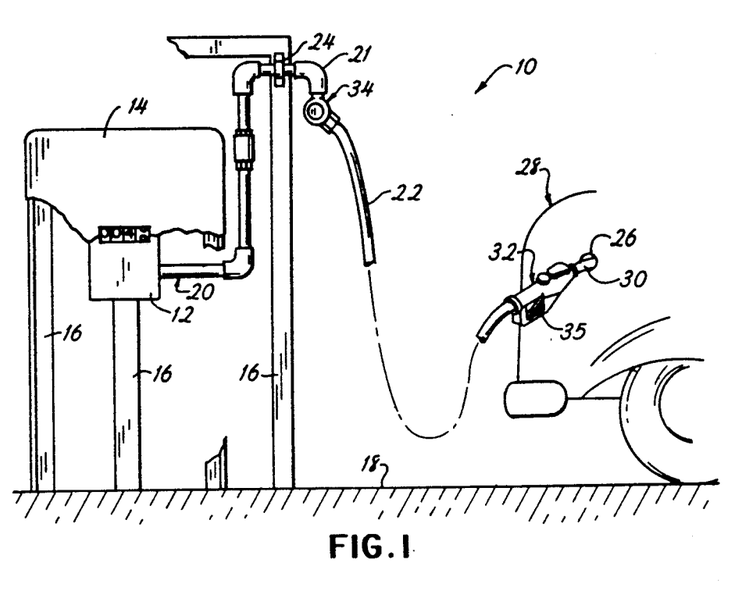
FIG. 1 is an elevational view of an automobile at a fuel dispensing station illustrating fuel being dispensed into the automobile from pumping apparatus having a fuel delivery line incorporating a detachable coupling constructed in accordance with the present invention.

Referring now to the drawings, a swivel joint coupling according to the present invention may be utilized in connection with fuel dispensing facilities of various types especially those dispensing stations which dispense gasoline and diesel fuel to the public. Although other applications may readily be envisioned, for disclosure purposes the present invention will be described in conjunction with fuel dispensing stations located at service stations. Thus, as illustrated in FIG. 1, a dispensing station generally indicated at 10 includes measuring apparatus 12 adapted to receive and measure pressurized fluid fuel, such as gasoline and fuel oil, pumped from a remotely located storage tank through underground piping (not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22. Adjacent the connection with the hose, and intermediate that location and the measuring equipment, the piping 20 which may include an elbow 21, is anchored by conventional anchoring means 24 to a structural support, which may be part of the structural framework 16. The anchoring means 24 secures the piping and resists the external loads which may be placed on the various components to thereby resist damage to those components and the measuring apparatus 12. The flexible hose 22 is of a conventional reenforced construction as approved by the appropriate regulatory bodies, and may be of the coaxial type having inner and outer fluid conduits of any convenient size and length which is specified for the particular dispensing apparatus to permit an operator to easily reach the fuel tank inlet 26 of a vehicle 28 for insertion therein of the spout 30 at the end of a rigid dispensing nozzle 32, the nozzle being connected in flow communication with the hose 22 either directly or by means of a swivel joint connector or coupling constructed in accordance with at least one subsequently described embodiment of the present invention. Alternatively, and in accordance with the preferred embodiments of the present invention, the swivel joint connector 34 is placed between the hose and the rigid piping, as illustrated in FIG. 1. In those jurisdictions requiring a dual passage system, i.e., a fuel supply and a vapor return, not only is the hose 22 generally of the coaxial type, but, so too are the piping 20, couplings, fittings etc. and of course the nozzle 32. In those systems the swivel coupling 34 of the present invention also is coaxial as hereinafter described. Conventionally, the nozzle includes valving in the fluid passageway in the body thereof, the valving being controlled by an adjustment trigger 35 biased to close the valving and operable to open the flow passageway upon depression or squeezing by the operator.

Under normal conditions, a vehicle operator will drive his or her vehicle 28 adjacent the fuel dispensing station 10, and then either an attendant or the operator will remove the nozzle 32 from a storage location on the cabinet 14, turn on the pumping equipment, insert the nozzle spout 30 into the inlet to the vehicle fuel tank, and squeeze the trigger 35 to dispense the fuel. When the dispensing operation is completed, the individual is expected to remove the nozzle spout from the fuel tank inlet, turn off the pumping equipment and replace the nozzle on the dispenser cabinet, the hose 22 making a loop between its ends. After paying for the fuel received, the vehicle operator will drive the vehicle from the premises. Occasionally, a vehicle may be driven from the proximity of the dispensing station 10 without first removing the nozzle spout 30 from the fuel tank inlet 26. This may occur for a number of reasons, and is not necessarily limited to individual operators pumping their own gas, but could occur as a result of a driver of a large truck not being able to see the station attendant and believing the fueling process to be completed. When this occurs forces are generated at the nozzle which may dislodge and damage the measuring equipment 12, the forces generated being tensile forces which are transmitted from the nozzle through the hose 22 to the piping and resisted by the anchoring means 24. However, when such forces exceed that for which the anchoring means is capable of withstanding, damage to the measuring equipment 12 as well as the various components of the piping may result. Additionally, when such damage occurs the highly combustible fuel may be spilled resulting in a potential fire hazard and additional environmental hazards.

Described in the aforesaid Nitzberg et al U.S. Pat. No. 4,779,638 are combination swivel joint and quick disconnect devices for single fluid systems which may be interposed between the hose 22 and the nozzle 32 thereby serving as a detachable and flexible nozzle swivel, or alternatively it may be interposed between various sections of the hose or between the elbow 21 of the piping and the hose to thereby serve as a detachable and flexible hose swivel. However, as with conventional swivel couplings, the detachable swivel device disclosed in that patent may not function as a swivel when the direction of application of the tensile force prevents pivoting of the components about the pivot axes. This can occur when the swivel joint connector will not permit the end connected to the hose to align itself with the direction in which the tensile force is applied. When this occurs a bending moment results and if the tensile force is sufficient a shearing of the interconnecting swivel members of the joint can result. This problem was addressed by the device disclosed in the aforesaid Nitzberg et al U.S. Pat. No. 4,791,961 wherein at least the longitudinal axis of that portion of the swivel joint which is connected to the hose (or other flexible conduit) is always offset from the one plane which passes through the first swivel axis of the first body member and the connecting member attached to the nozzle (or other rigid conduit) parallel to the other swivel axis. This permits the coupling to align the longitudinal axis with the direction of any tensile force applied through the hose. However, the addition of the swivel connector adds some five inches to the hose assembly and may result in the hose 22 engaging and rubbing on the ground due to the extra length of the loop between its ends when the nozzle is returned to the dispenser after use. However, certain regulations mandate against such engagement. The excessive wear on the hose due to such rubbing engagement is intensified when the swivel connector is designed for dual fluid systems, such as that disclosed in Nitzberg et al U.S. Pat. No. 4,827,960, since the outer hose surface of the coaxial hoses used in such systems is relatively soft and flexible. This and the other aforementioned problems is addressed by the present invention.

Figures 2, 6, 7:
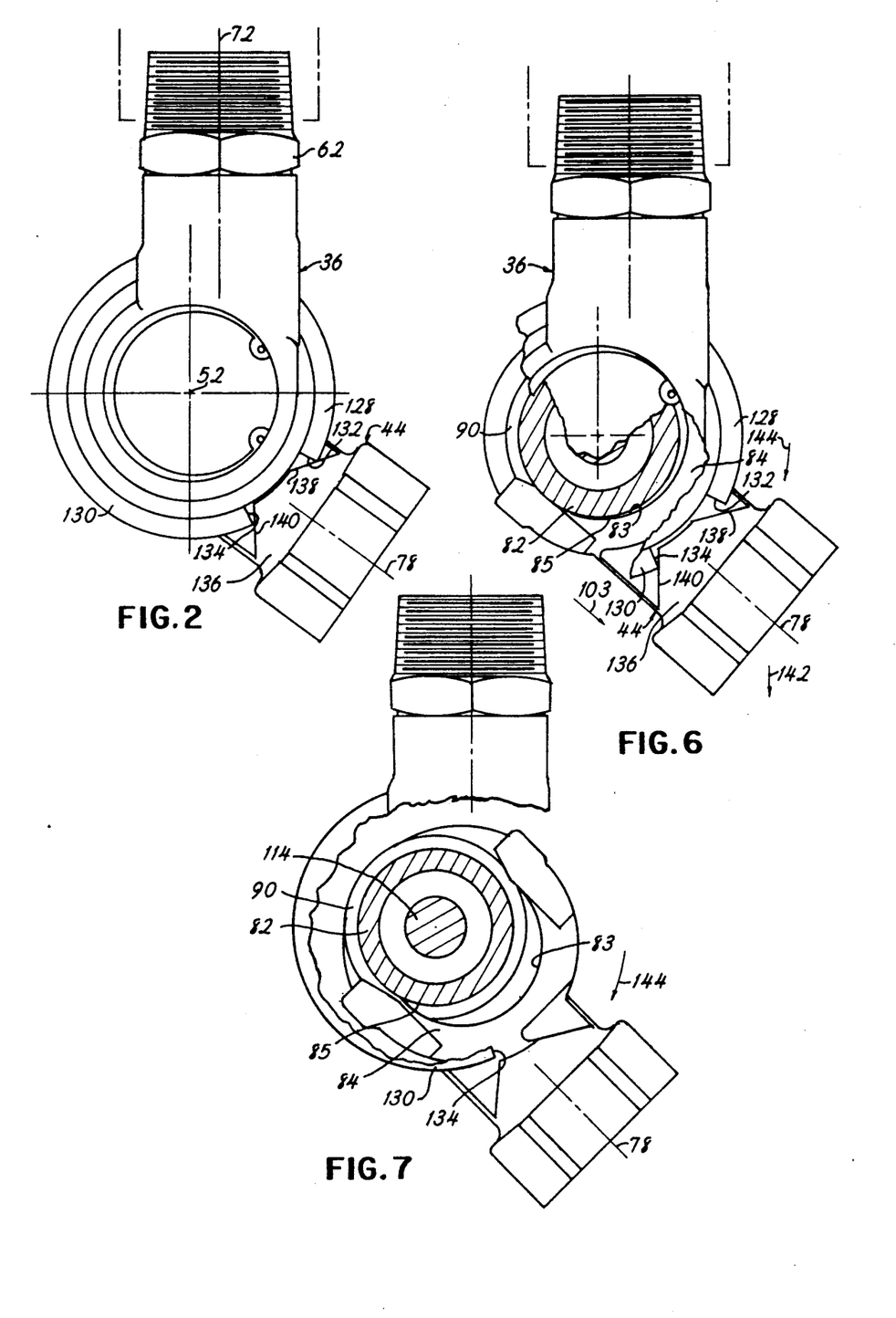
FIG. 2 is a plan view of the coupling illustrated in FIG. 1 greatly enlarged in relation thereto.
FIG. 6 is a view similar to FIG. 2 partly broken away and sectioned, and illustrating an initial step in the uncoupling when an excessive non-axial force is applied to the coupling.
FIG. 7 is a view similar to FIG. 6 illustrating a subsequent step in the uncoupling of the members.
Figure 3:
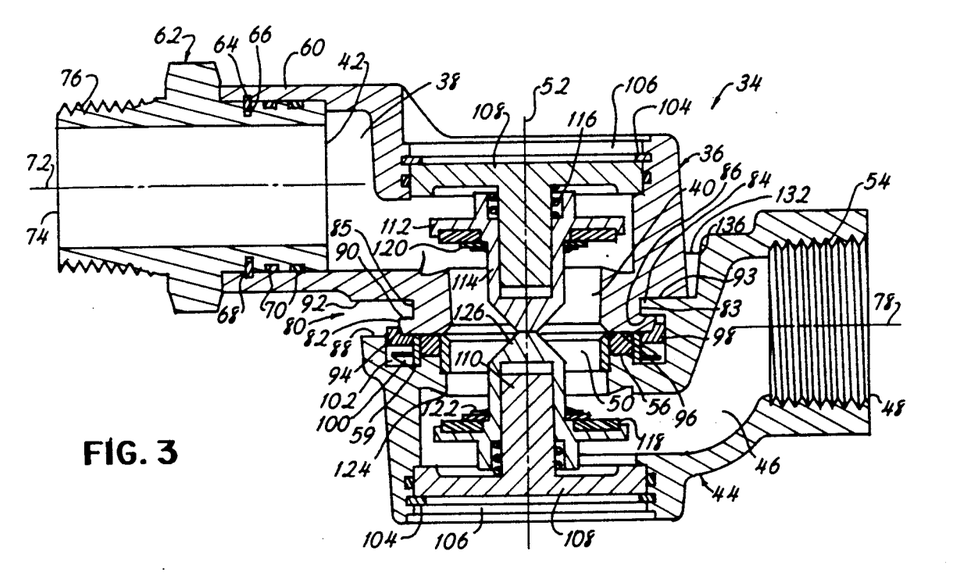
FIG. 3 is a cross sectional view taken substantially along line 3—3 of a coupling constructed in accordance with the present invention for utilization in a single fluid fuel system.
Figures 5, 8:
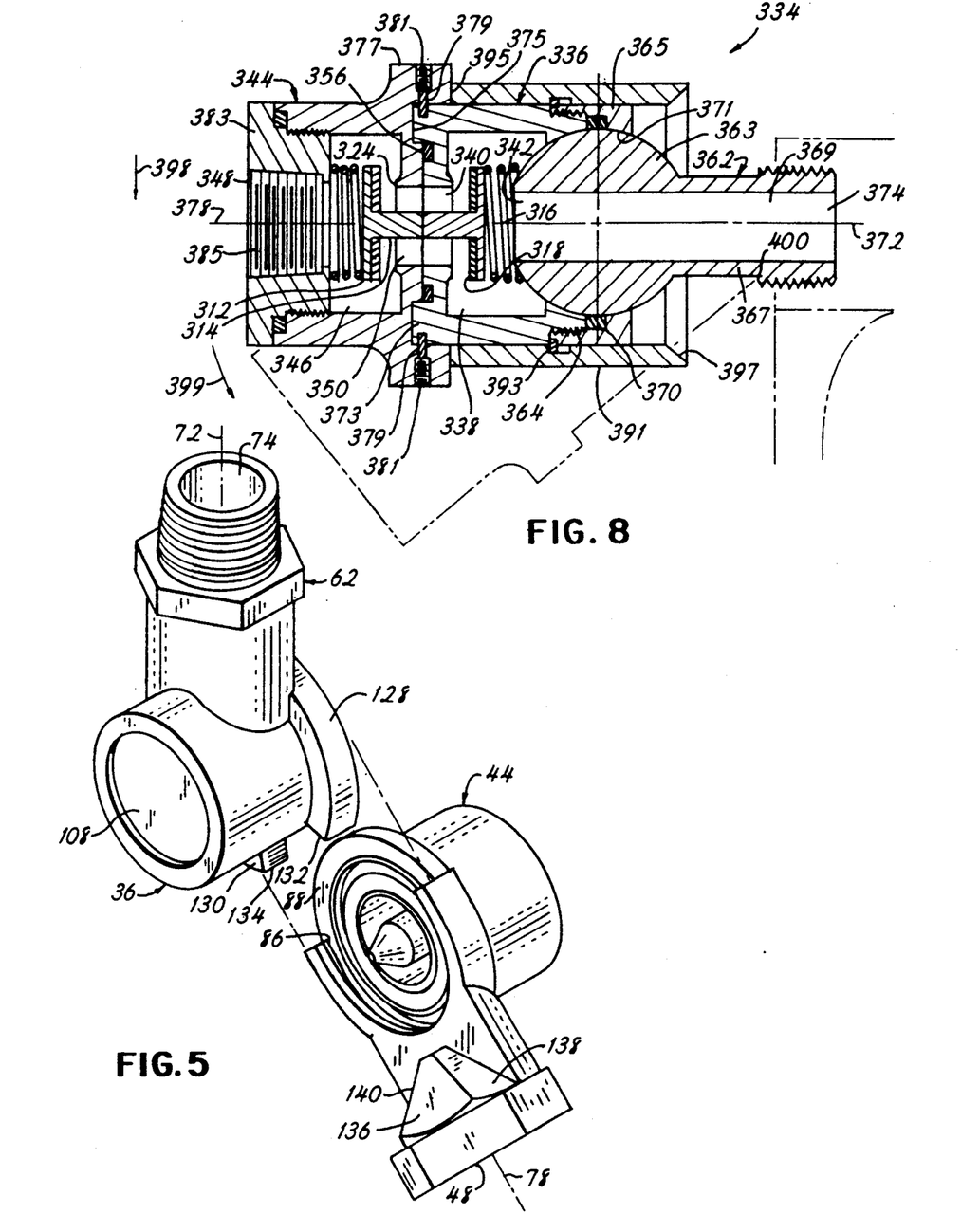
FIG. 5 is a perspective view of the coupling illustrated in FIG. 3 in an uncoupled position.
FIG. 8 is a cross sectional view of another embodiment of the present invention utilizing a spherical ball joint.

As illustrated in the drawings, the preferred form of the detachable swivel coupling 34, as illustrated in FIGS. 2, 3 and 5, comprises a first body member 36 defining a fluid passageway 38 therein, the passageway 38 having a portal 40, which, in the preferred embodiment, is an outlet and a portal 42 which is herein an inlet. As will become clear the portal 40 may be an inlet and the portal 50 an outlet if, for example, the coupling is connected between the hose 22 and the nozzle 32, or if the threads 48 were male and the threads 76 female. The detachable swivel additionally includes a second body member 44 defining a fluid passageway 46 therein which communicates fluid to a portal 48 forming an outlet to a portal 50 herein forming an inlet. As hereinafter described, the inlet portal 50 of the second body member 44 is mounted in flow communication with the outlet portal 40 of the first body member 36 by means of interconnectable members which would permit the body members 36 and 44 to swivel or rotate relative to each other relative to a pivot or swivel axis 52 as in the aforesaid Nitzberg et al patents, but in accordance with the present invention is restricted such that substantial rotation is prevented. The inlet 48 is adapted to be connected by conventional means such as threads 54 in flow communication with a male coupling (not illustrated) conventionally attached to the hose 22. One or more fluid seals such as a "quad" seal 56 suitable for maintaining flow communication between the inlet 50 of the body member 44 and the outlet 40 of the body member 36 may be provided as hereinafter described when the body members are in the coupled or operative disposition to preclude leakage therebetween, a retaining member 59 acting to hold in place the seal and a detent ring 98 hereinafter described.

The inlet 42 of the first body member 36 is disposed internally within an annular extension or annulus 60 formed at the inlet end of the body member 36, and is connected to a connecting member 62 for communicating the fluid fuel therethrough, the connection between the connecting member 62 and the first body member 36 being by means of a swivel joint. For example, as preferred, the connecting member 62 is a male member for connection to the elbow 21 or may be connected to the nozzle and is received within the annulus 60 and rotatably connected thereto by means of an annular spring type retainer or detent member 64 disposed within an annular recess 66 formed in the outer wall of the connecting member 62 and received within an annular recess 68 formed in the inner wall of the annulus 60. A pair of seals in the form of "O" rings 70 preclude leakage of fluid through the portal. Relative rotation of the connecting member 62 and the body member 36 occurs about a pivot or swivel axis 72. The connecting member 62 has an inlet portal 74 through which fuel may flow to the passageways 38, 46 of the body members 38, 44 respectively. Thus, the outlet portal 48 of the body member 44 and the inlet portal 74 of the connecting member 62 may revolve relative to each other about the axis of rotation 72. As hereinafter explained, rotation about the axis 52 is precluded, and although these axes are inclined substantially normal to each other, they may or may not be offset relative to each other, although they are illustrated in FIG. 2 as being offset. The inlet section of the connecting member 62 is adapted, by conventional means such as threads 76, to be connected in flow communication with the nozzle 32, but preferably is connected to the elbow 21 as illustrated in FIG. 1.

The fluid passageway 38 in the body member 36 is diverted in direction from the axis 72 through the inlet portal 74 to the portal 40 preferably by 90°. Additionally, the fluid passageway 46 through the second body member 44 is diverted from the direction of fluid flow between the first body member 36 substantially along the axis 52 to a direction extending in a line of flow along a longitudinal axis 78 through the outlet portal 48, this being the direction of fluid flow through the flexible hose at the connection with the second body member 44. Thus, both the first body member 36 and the second body member 44 have diverted passageways 38, 46 respectively which change the direction of flow through the swivel joint, the passageway 38 acting to change the flow direction from that coincidental with the swivel axis 72 so that coincidental with the axis 52, while the passageway 46 changes the direction of flow in the body member 44 from that coincidental with the longitudinal axis 78 to a direction coincidental with the axis 52. Furthermore, as hereinafter described the axes 72 and 78 preferably do not lie in parallel planes except for the plane in which the body members move to couple or uncouple, as illustrated in FIG. 2 and as hereinafter made clear, and in any event they are never coincident. Thus, a plane passing through the axis 72 parallel to the axis 52 always intersects the axis 78. Although in the axis 72 and 78 are offset from the axis 52, they need not.

In order to couple the first and second body members 36, 34 together in flow communication and to uncouple them when an extraneous tensile force in the axial direction, i.e., in the direction of the axis 78, in excess of a predetermined level is applied so as to terminate flow communication, interconnectable means generally indicated at 80 is provided, such means permitting the body members to permit fuel to flow between the inlet 74 and the outlet 78 when coupled and to forcibly uncouple by sliding apart due to the axial tensile force or an axial tensile force vector applied along the line of action extending along the axes 78. The interconnectable means 80 comprises interlocking members 82 and 84 formed on the first and second body members 36, 44 respectively. These interlocking members are constructed in a mortise and tenon fashion in the sense that the member 82 is received within a dado slot 86 formed in step fashion between the member 84 and a surface 88 of the body member 44, the member 82 having a surface 90 spaced from a ledge 92 formed on the body member 36, and the member 84 is received within the space between the surface 90 and the ledge 92 so that the outer peripheral surface 83 of the member 84 abuts the inner peripheral surface 85 between the member 82 and the ledge 92. This is substantially identical to the devices of the aforesaid Nitzberg et al U.S. Pat. Nos. 4,779,638 and 4,791,961, the interlocking member 84 being an arcuate substantially semi-circular segment formed about the axis 52 at the fluid inlet 50 of the body member 44, and the interlocking member 82 preferably being a circular annular segment formed about the fluid outlet 40 in the body member 36, the center of the annulus being the axis 52 when the first and second body members are coupled. Additionally, when the body members are coupled the upper surface 93 of the member 82 and the facing surface of the ledge 92 abut. The interlocking members 82 and 84 thus have corresponding surfaces which interface together when the first and second body members are slidably juxtaposed into coupling engagement, i.e., the member 82 sliding into the dado slot 86. Because of constraints, which will hereinafter become clear, and since the member 82 can only enter and leave the dado slot 86 in the direction along the axis 78, the member 82 need only be a semi-circular segment receivable in the dado slot 82.

The peripheral wall 94 of the interlocking member 82 has a concically tapered form, the taper being from the outer lip of the surface 90 to the outer surface 96 spaced from the surface 90 remote from the ledge 92. When the members 82 and 84 are joined, the conically tapered portion of the member 82 interfaces with a correspondingly tapered internal portion of an annular detent ring 98, the detent ring being urged into engagement with the member 82 by means of a preloading biasing wave spring 100. The detent ring 98 and the spring 100 are received within a well or recess 102 formed in the body member 44 and opening onto the dado slot adjacent the ledge 88. When so held the member 82 is prevented from moving relatively to the member 82 in the direction of disengagement. Preferably the angular taper may be in the order of approximately 18° to 30° with respect to the axis 52. Thus, an infrangible release is provided by the cooperation of the interconnecting members and the detent ring, the release acting to uncouple the body members 36 and 44 upon the application of an axial tensile load vector in excess of a predetermined level in the direction of disengagement.

When a load beyond that for which the coupling is designed is exerted on the fuel line the resolved force vectors generated at the inclined or tapered co-acting surface of the member 82 and the detent ring 98 produce a force component in a direction substantially parallel to the axis 52. This force is resisted by the friction between the member 82 and the detent ring, by the friction between the detent ring and the annular well or recess 102, and by the bias force of the spring 100. When the cumulative total of the resisting forces is exceeded, the detent ring 98 is forced into the annular well 102 away from the member 82 of the body member 36. This thereby frees the interlocking members 82, 84 to disengage from one another thereby permitting the interlocking members to move from axial alignment with each other and separate in the uncoupling direction. Thus, if for example, the vehicle 28 drives away from the fuel dispensing station with a nozzle spout 30 within the inlet 26 of the fuel tank, and if the axial tensile force vector generated at the connection between the hose and the body member 44, for example, in the direction of the arrow 103 illustrated in FIG. 6, exceeds the predetermined level, the body members 36 and 44 will separate.

The infrangible release provided may subsequently be re engaged to again couple the body members 36 and 44. The recoupling may occur by depressing the detent ring 98 into the recess 102 against the action of the spring 100, and thereafter reinserting the member 82 into the dado slot 86 until the members 82 and 84 again interlock, at which time the detent ring 98 is again forcibly urged into contact with the interlocking member 82 and the conically tapered portions are again seated. Of course, frangible release means may be utilized rather than the infrangible means illustrated in the preferred form of the invention. For example, positioning a retaining member in the space between the surface 88 and the flange 82 with a shear pin extending through the retaining member and the body members provides such a frangible release. Other frangible releases can be readily envisioned, such as extending the ledge 92 downwardly toward the surface 88, and inserting a shear pin through the body member 44 at the location of the surface 88 and into the ledge 92.

Valving means is provided in each of the body members 36, 44 disposed for maintaining the portals 40, 50 in flow communication with each other when the body members 36 and 44 are coupled together, yet close the respective passageways when the body members are uncoupled. Thus, an annular retaining ring 104 is disposed in a cavity 106 in each body member 36, 44, for positioning a cap valve 108 therein. The cap valve 108 includes a guide spindle 110 extending substantially along the axis 52. A check valve 112 having an integral hollow stem 114 receives the spindle 110 and is movable along the axis 52 provided by the spindle 110, while a coil spring 116 acts to bias the check valve 112 toward the respective portal. An annular check valve seat 118 is disposed about a rim of the check valve 112 and is retained thereon by means of a pair of annular retaining members 120, 122. When the body members are disconnected from each other, the valve seat 118 is forced into cooperation with an annular seat 124 to close the respective portal 40, 50, and when this occurs the free end 126 of the valve stem 114 projects out of the respective portal. When the body members are coupled together the free ends 126 of each of the valve stems 114 are forcibly engaged to overcome the bias of the respective spring 116 and open the flow path through the portals 40, 50.

As best illustrated in FIGS. 2 and 5 through 7, in order to maintain the bottom of the hose loop substantially the same height above the ground or the surface of the island on which the dispenser is mounted, as a hose of the same length without an uncoupling device when the nozzle is mounted in the dispenser and yet permit the body members to uncouple not only when there is an excessive tensile force along the axis 78, but also when an non-axially applied excessive tensile force is exerted on the coupling in such a direction that the coupling cannot be aligned with the axial force vector by rotating about the swivel axis 72 and uncouple in the same manner as when the tensile force is axially applied, the present invention positions the body members 36, 44 relative to each other and restrains their relative rotation about the axis 52, and also redirects such forces to ensure that there is an axial component. To these ends, the body member 36 includes a pair of flanges 128, 130 formed on the exterior thereof and spaced form the ledge 92 remote from the member 82, the flanges terminating at respective abutment surfaces 132 and 134 offset relative to the axis 72. Formed on the body member 44 is a cam member 36 having a substantially wedge shaped configuration including a pair of inclined cam surfaces 138, 140 which are spaced apart to be received in the space between the abutment surfaces 132, 134 when the body members 36, 44 are coupled together. When the cam member 36 is so positioned between the abutment surfaces of the flanges 128, 130, there is a very slight clearance space between the surfaces 132, 134 and 138, 140 so that when the body members are coupled together there is substantially no relative rotation between them about the axis 52. The disposition of the surfaces 132 and 134 relative to the axis 72 and the disposition of the surfaces 138 and 140 relative to the axis 78 are such that the portals 74 and 78 are offset at a substantial angle so that a plane passing through the axis 72 parallel to the axis 52 will always intersect the axis 78, the latter axis being the direction along which the body members may be coupled and uncoupled, i.e., the direction of an axial tensile force applied through the hose 22 to the coupling. Preferably, as illustrated in FIG. 2, the angular relationship between the axes 78 and 72, and thus the angular relationship between the planes of the portals 48 and 74 is in the order of approximately 30 to 45 degrees. Thus, as will be appreciated from FIG. 1, when the connecting member 62 is attached to the dispenser with the axis 72 extending vertically, the adjacent portion of the hose 22 connected to the portal 48 extends outwardly at an angle away from the dispenser and when the nozzle 32 is relocated in the stored position on the dispenser, the bottom of the hose loop will be above the location it would have if the body members could pivot relatively about the axis 52.

In operation, if an excessive tensile force in the axial direction 78 were applied through the hose 22 due to, for example, the vehicle 28 driving away from the dispenser with the nozzle 32 in the vehicle, the force would disconnect the members 82 and 84 as heretofore described, and this is true even if the excessive tensile force is non-axially applied but causes rotation of the body members about the swivel axis 72 of the connecting member 62 to cause the axis 72 to align with the axial force vector. However, if a bending or twisting load is applied through the hose 22 to the coupling, such as, for example, a load in the downward direction 142 as illustrated in FIG. 6, the cam surface 140 of the cam member 136 will be forced against the abutment surface 134 of the flange 130. This will result in the inner surface 83 of the interlocking member 84 to rotate on the cylindrical outer surface 85 of the interlocking member 82 in the direction 144. This further causes the camming surface 140 and the abutment surface 134 to apply a mechanical advantage to the axial component of the bending or twisting load in the direction along the axis 78. This results in the tapered wall 94 of the interlocking member 82 of the body member 36 to slide from capture by the detent 98 which is rotatably held in the body member 44 by the retaining member 59. As illustrated in FIGS. 6 and 7, as the relative rotational movement of the surfaces 83 and 85 of the interconnectable members 84 and 82 respectively continues aided by the action of the cam surface 140 against the edge of the abutment surface 134 at the interface of the outer peripheral surface of the flange 130, the magnification provided by the mechanical advantage of the wedging or camming action in creating and intensifying the axial tensile force vector, i.e., the force vector in the direction of the axis 78 resolved from the initially applied force in the direction 142, the interconnectable members 82 and 84 escape their coupling relationship and the body members uncouple as the body member 44 is released in the axial direction.

The amount of threshold force required to produce uncoupling of the body members when a twisting or bending load is applied may be varied by several means. For example, the angle of the cam faces 138, 140 relative to the axis 78 may be varied, and as illustrated in the drawings the face 140 makes a smaller angle than the face 138 and therefor would require a greater threshold force since the axial force vector would be smaller with a face of that inclination. Additionally, the diameter of the flanges 128, 130 at the interface with the abutment surfaces 132, 134 may be varied to vary the mechanical advantage. Other means of varying the threshold force would be by varying the coefficient of friction between the faces 132, 134 with the camming surfaces 138, 140. The threshold load, whether the force is axially applied or the force is a bending or twisting force, may be varied by changing the spring constant or force applied by the spring 100, changing the taper of the wall 94, or changing the coefficient of friction between the tapered wall 94 and the detent member 98.

Figure 4:
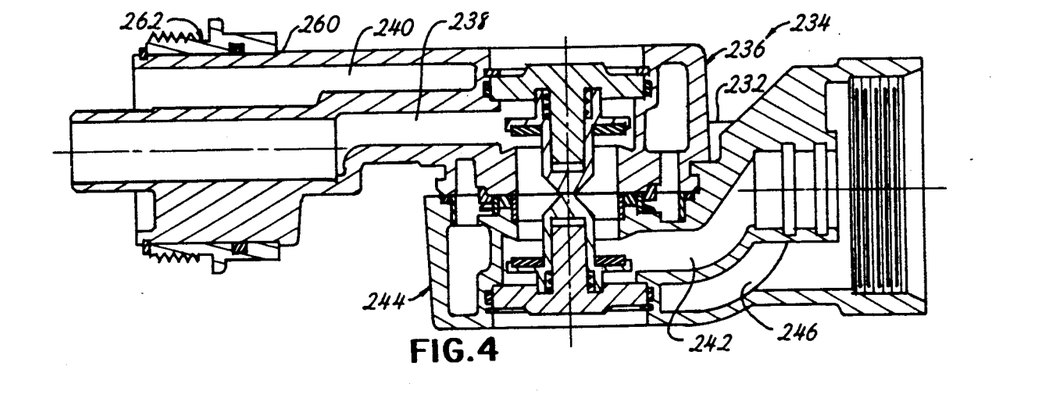
FIG. 4 is a view similar to FIG. 3 but of a coupling constructed for utilization in a fuel system having a vapor return line.

Substantially identical coupling and uncoupling means may be provided for a dual fluid system such as illustrated in U.S. Pat. No. 4,827,960. For example, as illustrated in FIG. 4 in regard to such a coupling 234 having valving for shutting the flow of fluid when the body members 236 and 244 uncouple, and obviously as taught in the aforesaid U.S. Pat. No. 4,827,960, may also have valving for shutting the flow of vapor in addition to the flow of fuel when the body members uncouple. The body member 236 has a fuel passageway 238 and a vapor passageway 240, while the body member 244 has a fuel passageway 242, and a vapor passageway 246, the respective fuel and vapor passageways being separated one from the other. The fuel passageway 238 of the body member 236 communicates with the fuel passageway 242 of the body member 244, and the vapor passageway 240 of the body member 236 communicates with the vapor passageway 246 of the body member 244 when the body members are connected together in the same manner as the single fluid system illustrated in FIG. 3. Also, a connecting member 262 is rotatably mounted on an annular portion 260 of the body member 236. The external configuration of the body members 236 and 244 are identical with that of the body members 36 and 44, i.e., it includes identical structure to the wedge 136, cam surfaces 138 and 140, and flanges 128, 130 with the abutment surfaces 132 and 134, the abutment surface 232 illustrated in FIG. 4 being identical with the abutment surfaces 132 illustrated in FIGS. 2, and 5 through 7. Accordingly, additional description is not believed necessary and would be merely redundant. Those skilled in the art will recognize that similar coupling devices with more than two separate passageways could be similarly constructed in accordance with the teachings of the present invention, all such devices being contemplated by the present invention.

Another embodiment of the coupling of the present invention is illustrated in FIG. 8. Here coupling 334 includes a ball or spherical joint swivel connecting member 362 universally pivoting within a first body member 336 relative to the dispenser piping 21 or nozzle 32, the ball portion 363 of the connecting member being mounted for pivoting relative to the body member by means of a packing nut 365 threadedly fastened to the body member 336 by threads 364. The stem 367 of the connecting member 362 has a portal 374, which is the inlet to the coupling when connected to the dispenser piping or the outlet when connected to the nozzle, and communicates through a bore 369 in the stem to another portal 342 into a fluid passageway 338 within the body member 336. The packing nut 365 has an annulus with a spherical surface 371 for permitting the ball 363 to swivel in universal fashion and compresses packing material 370 between the ball and the body member 336 to prevent leakage past the ball. The end of the first body member remote from the packing nut 365 has an annular rim 373 received within an annular recess 375 formed in an enlarged rim portion 377 of the second body member 344 at the end facing the first body member 336 so as to form interconnectable means on the respective body member, an "O" ring seal or the like 356 acting between abutting surfaces of the body members when connected together. One or more frangible members or shear pins 379 extend radially through corresponding radial bores in the rims 373 and 377 and are held in position by small set screws 381. The body member 344 has a fluid passageway 346 communicating with the passageway 338 in the body member 336 by means of respective portals 350, 340. Threadedly received in the end of the body member 344 remote from the body member 336 is an annular cap 383 which includes a bore 385 communicating the passageway 346 with a portal 348, the bore 385 having threads for connection to the hose 22.

Disposed within each of the body members 336, 344 is respective identical valve members 312 having integral stems 314 projecting toward the respective portal 340, 350, the valve members having annular valve seats 318 facing annular seats 324 disposed about the portal 340, 350. Springs 316 act against the face of the respective valve member 312 remote from the seats abutting the cap and the ball respectively to urge the valves into closing relationship with the portals 340, 350 when the body members 336 and 344 are separated, the stems acting against the urging of the springs to maintain the portals open when the body members are uncoupled.

When a tensile load is applied to the coupling that is substantially axially directed, i.e., axially relative to the axis 372 or 378, and is of a magnitude to share the pins 379, the body members 336 and 344 will separate and uncouple. If, however, a non-axial bending or twisting load is applied through the hose to the coupling, and if the load is directed such that the body members cannot swivel about the ball relative to the axis 372 to align the body members with the axial force vector and uncouple when the force is excessive in the same manner as when an axial tensile force is applied, in accordance with the principles of the present invention means for applying a mechanical advantage to redirect the force to obtain a sufficient axial force vector to affect shearing of the pins 379 is provided. To this end a sleeve 391 is disposed about the body member 336 and the packing nut 365 and slidably positioned thereon by means of a snap ring 393 or the like. The sleeve at the end 395 facing the second body member is positioned in abutting relationship with the face of the rim portion 377 of the second body member, and at the end remote from the second body member has an incline face 397 forming a cam surface. Thus, when a tensile force is applied in a direction such as illustrated by the arrow 398, and if this force is excess of the predetermined threshold amount, the coupling will have rotated in the direction illustrated by the arrow 399 to the position depicted in phantom, and just prior to the packing nut contacting the stem 367, the cam surface 397 of the sleeve will abut the stem at the point 400. Further forced rotation of the coupling will result in the sleeve overcoming the urging of the snap ring 393 and move axially toward the second body member 344 resulting in shearing of the pins 379 and uncoupling of the body members. The action of the cam surface 397 against the abutment surface of the stem 367 provides a mechanical advantage which intensifies the axial force vector, i.e., the force vector in the direction of the axis 378 resolved from the bending load, and since a force in the axial direction is a shearing force on the pins 379, the pins will shear when the force is above the predetermined excessive force.

Figures 9, 10:
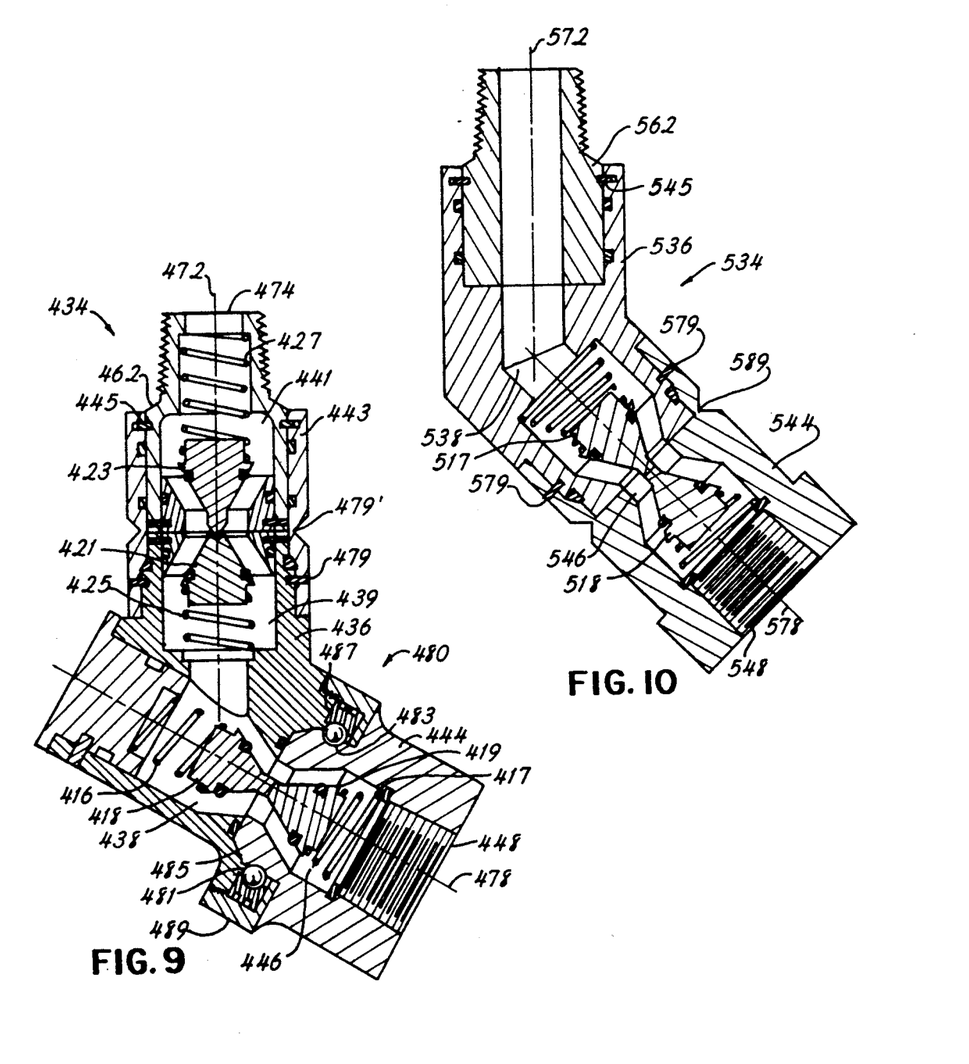
FIG. 9 is a cross sectional view taken through another embodiment of a coupling constructed in accordance with the present invention having separate release means for axial and for bending forces in excess of predetermined limits.
FIG. 10 is a modification of the coupling illustrated in FIG. 9

A further embodiment of the present invention is illustrated in FIG. 9 wherein two separate and independent releases are provided for uncoupling the coupling 434, one release acting to disengage when an excessive axial tensile load is applied by the hose and the other release acting to disengage when an excessive bending or twisting load is applied by the hose. The coupling 434 comprises a first body member 436 and a second body member 444 connected thereto by means of a first interconnectable means 480, the body members 436, 444 being angularly inclined relative to each other. The body member 444 has a portal adapted to be connected to the hose 22 so that axial tensile loads on the hose are applied substantially along the axis 478, the portal 448 opening into a fuel passage 446 which communicates with a fuel passage 438 in the body member 436.

The first interconnectable means 480 is an infrangible recouplable means comprising a plurality of spaced apart balls 481 disposed circumferentially about the body member 444, each ball being disposed in a spherical recess 483 formed in a peripheral ledge 485 in the body member 444. The recesses are upset about the balls so that the balls do not permit rotation of the body member 444 relative to an elastomeric compression member 487 which radially urges the balls into the recesses. A cup-shaped retaining member 489 is threadily secured to a peripheral portion of the body member 436 and as it is tightened onto the body member 436 forcibly compresses the member 487 against the balls 481. Thus, the balls act as detents relative to the body member 436. When an excessive tensile load in the axial direction is applied by the hose, the balls will be pulled out from the grasp of the elastomeric compression member and the body members 436 and 444 will separate. Valving including valve members 418, 419 in the respective body members 436, 444 as urged by springs 416, 417 respectively close communication between the passages 438 and 446 when the body members uncouple.

The passage 438 in the body member 436 communicates with a diverted passageway 439 in that same body member, the passage 439 communicating with the passageway 441 in a connecting member 462. The connecting member 466 has a portal 474 adapted for communication with the nozzle 32, but preferably for communication with the dispenser piping 21. A sleeve 443 is connected to the connecting member 462 by means of a snap ring 445 received within respective corresponding radial slots formed in the outer periphery of the connecting member and the inner periphery of the sleeve 443 for permitting relative rotation therebetween about the axis 472. The sleeve 443 is non-rotatably connected to the body member 436, the connection preferably being by a shear pin 479 which permits uncoupling of the connecting member 462 from the first and second body members when the pin 479 fails, or alternatively, instead of the shear pin, the connection may be by other means such as threads (not illustrated) in which case the sleeve 443 may have an area of reduced wall thickness such as a circumferential notch 479' to provide a frangible or ruptureable area of high stress concentration. In either case a non-axial load applied by the hose, such as a bending or twisting load, if of such direction does not permit the body members to be aligned with the axial force vector to separate at the interconnectable means 480, and if the force is of a sufficient magnitude in excess of a predetermined amount, the force will bend and shear the pin 479 or fracture and rupture the weakened stress concentration area 479' to separate the body members from the connecting member 462. In this embodiment it is obvious that additional valving is required between the body member 436 and the connecting member 462, such valving including valves 421 and 423 in the respective members, each valve being urged by a respective spring 425, 427 to close the respective passageway 439, 441.

A modification of the embodiment of FIG. 9 is illustrated in FIG. 10 wherein the additional valving is not necessitated. Here the coupling 534 comprises first and second body members 536 and 544, the body member 544 having a fuel passageway 546 normally communicating with the diverted passageway 538 of the body member 536. A connecting member 562 is rotatably connected by a snap ring 545 to the interior of the body member 536 for relative rotation about the axis 572.

The body members 536, 544 are connected together by one or more shear pins 579 and when an axial tensile force substantially along the axis 578 is applied by the hose 22 connected to the portal 548 of the body member 544, if the force is excessive, the pins 579 will shear. Additionally, the body member 544 has a circumferential notch 589 to provide a frangible high stress concentration zone, and if the load applied by the hose is non-axially directed and the body members cannot align with the axial vector by rotating about the connecting member 562 to separate, the bending or twisting force will rupture the material in the stress concentration zone and the body members 544 will break in two. In either case, valving such as valves 517, 518 will close the passageway portals between the first and second body members in a manner similar to that in the other embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a fuel dispensing system including a liquid dispensing station for receiving fuel from a remote location and supplying fuel to a rigid conduit, a flexible fuel line, and a rigid nozzle including operator actuated means operatively connected to said fuel line, a detachable safety device connected in said fuel line intermediate said nozzle and said conduit for coupling portions of said line together and for uncoupling when an excessive tensile force is exerted on said fuel line, said device comprising a first body member having a first portal, a second portal and a fluid passageway therebetween; a connecting conduit having first and second portals; means for rotatably connecting said connecting conduit to said body member with said first portals in flow communication; means for connecting said second portal of said connecting conduit to one of said rigid conduit and said nozzle; a second body member having a first portal, a second portal and a fluid passageway therebetween; interconnectable means for coupling said first and second body members together with the second portal of said first body member in flow communication with the second portal of said second body member to permit fuel to flow therebetween when said body members are coupled; means for connecting said first portal of said second body member to one end of said flexible fuel line; said first end of said fuel line having a longitudinal axis passing through said first portal of said second body member when connected thereto; means for connecting a second end of said fuel line to the other of said rigid conduit and said nozzle so that fuel may flow from said rigid conduit through said body members to said nozzle when said body members are coupled together; said interconnectable means comprising elements on said first and second body members permitting said body members to couple and uncouple in a direction disposed substantially parallel to said axis; first abutment means fixed to said first body member; second abutment means fixed to one of said second body member and said connecting conduit for abutting said first abutment means when an external tensile force above a threshold amount is applied in a direction inclined relatively to said axis, said first and second abutment means being disposed for producing a force vector in a direction substantially parallel to said axis; locking means for locking said body members together when coupled and for unlocking said body members when an external tensile force above a predetermined limit is applied to said fuel line in a direction substantially parallel to said axis or when said force vector is above said limit to permit uncoupling of said body members; and valve means in the fluid passageway of each body member for shutting flow communication between said body members when uncoupled.

2. In a fuel dispensing system as recited in claim 1, wherein said first abutment means comprises a pair of flanges disposed about said first body member spaced from said first interlocking member remote from said second interlocking member, said flanges being spaced apart to define a pair of abutment surfaces; said second abutment means comprising a protuberance formed on said second body member spaced from said second interlocking member remote from said first interlocking member and receivable between said abutment surfaces, said protuberance having a first cam surface for abutting one of said abutment surfaces and a second cam surface for abutting the other of said abutment surfaces.

3. In a fuel dispensing system as recited in claim 2, wherein said first and second cam surfaces are disposed in planes inclined relative to said longitudinal axis.

4. In a fuel dispensing system as recited in claim 2, wherein each of said rigid conduit, flexible fuel line, nozzle, first body member, second body member and connecting conduit include a vapor return passageway for returning vapor from said nozzle to said remote location.

5. In a fuel dispensing system as recited in claim 1, wherein said connecting conduit is rotatably connected to said first body member for rotation about a swivel axis passing through said first portal of said first body member, said passageway of said first body member being angularly diverted from the first portal to the second portal of said first body member, and said passageway of said second body member being angularly diverted from the second portal of said second body member to said longitudinal axis.

6. In a fuel dispensing system as recited in claim 5, wherein said interconnectable means comprises a first interlocking member disposed about the second portal of said first body member and a second interlocking member disposed about the second portal of said second body member, an arcuate mortise slot formed in one of said interlocking members and a correspondingly configured arcuate tenon defined in the other of said interlocking members, said tenon being cooperatively received within said mortise when said body members are coupled.

7. In a fuel dispensing system as recited in claim 6, wherein said locking means comprises an annular recess formed in the body member in which said mortise is defined and opening onto said slot, an annular detent ring disposed within said recess, and biasing means within said recess for urging said ring into engagement with said tenon at an angle inclined relatively to said longitudinal axis.

8. In a fuel dispensing system as recited in claim 7, wherein said ring and said tenon have cooperating annular surfaces, and said surfaces are inclined relatively to said longitudinal axis.

9. In a fuel dispensing system as recited in claim 6, wherein said tenon has a circular circumference and said mortise slot has a semi-circular cross sectional configuration.

10. In a fuel dispensing system as recited in claim 9, wherein said first abutment means comprises a pair of flanges disposed about said first body member spaced from said first interlocking member remote from said second interlocking member, said flanges being spaced apart to define a pair of abutment surfaces; said second abutment means comprising a protuberance formed on said second body member spaced from said second interlocking member remote from said first interlocking member and receivable between said abutment surfaces, said protuberance having a first cam surface for abutting one of said abutment surfaces and a second cam surface for abutting the other of said abutment surfaces.

11. In a fuel dispensing system as recited in claim 10, wherein each of said rigid conduit, flexible fuel line, nozzle, first body member, second body member and connecting conduit include a vapor return passageway for returning vapor from said nozzle to said remote location.

12. In a fuel dispensing system as recited in claim 10, wherein said first and second cam surfaces are disposed in planes inclined relative to said longitudinal axis.

13. In a fuel dispensing system as recited in claim 1, wherein said locking means comprises a frangible breakaway means.

14. In a fuel dispensing system as recited in claim 13, wherein said frangible breakaway comprises at least one shear pin interposed intermediate said first and second body members.

15. In a fuel dispensing system as recited in claim 1, wherein said connecting conduit includes a spherical portion, said first body member including a socket portion for receiving said spherical portion for permitting said first and second body members to swivel universally relative to said connecting conduit.

16. In a fuel dispensing system as recited in claim 15, wherein said first abutment means comprises an annular sleeve fastened to and disposed about said first body member, said sleeve having an annular abutment surface disposed intermediate said spherical portion and the second portal of said connecting conduit, said connecting conduit having an annular stem extending from said spherical portion toward the second portal of said connecting conduit, said second abutment means comprising the exterior surface of said stem.

17. In a fuel dispensing system as recited in claim 16, wherein said locking means comprises a frangible breakaway means.

18. In a fuel dispensing system as recited in claim 17, wherein said frangible breakaway comprises at least one shear pin interposed intermediate said first and second body members.

19. In a fuel dispensing system as recited in claim 1, wherein each of said rigid conduit, flexible fuel line, nozzle, first body member, second body member and connecting conduit include a vapor return passageway for returning vapor from said nozzle to said remote location.

20. In a fuel dispensing system including a liquid dispensing station for receiving fuel from a remote location and supplying fuel to a rigid conduit, a flexible fuel line, and a rigid nozzle including operator actuated means operatively connected to said fuel line, a detachable safety device connected in said fuel line intermediate said nozzle and said conduit for coupling portions of said line together and for uncoupling when an excessive tensile force is exerted on said fuel line, said device comprising a first body member having a first portal, a second portal and a fluid passageway therebetween; a connecting conduit having first and second portals; means for rotatably connecting said connecting conduit to said body member with said first portals in flow communication; means for connecting said second portal of said connecting conduit to one of said rigid conduit and said nozzle; a second body member having a first portal, a second portal and a fluid passageway therebetween; interconnectable means for coupling said first and second body members together with the second portal of said first body member in flow communication with the second portal of said second body member to permit fuel to flow therebetween when said body members are coupled; means for connecting said first portal of said second body member to one end of said flexible fuel line; said first end of said fuel line having a longitudinal axis passing through said first portal of said second body member when connected thereto; means for connecting a second end of said fuel line to the other of said rigid conduit and said nozzle so that fuel may flow from said rigid conduit through said body members to said nozzle when said body members are coupled together; said interconnectable means comprising elements on said first and second body members permitting said body members to couple and uncouple in a direction disposed substantially parallel to said axis; locking means for locking said body members together when coupled and for unlocking said body members when an external tensile force above a predetermined limit is applied to said fuel line in a direction substantially parallel to said axis to permit uncoupling of said body members; rigid force concentrating means responsive to an excessive tensile force in a direction inclined relative to said axis for uncoupling said first body member from one of said second body member and said connecting conduit; and valve means intermediate said first portal of said first body member and the first portal of said second body member for shutting flow communication between said rigid conduit and said nozzle when at least said first body member is uncoupled.

21. In a fuel dispensing system as recited in claim 20, wherein said force concentrating means comprises first abutment means fixed to said first body member, second abutment means fixed to one of said second body member and said connecting conduit for abutting said first abutment means when an external tensile force above a threshold amount is applied in a direction inclined relatively to said axis, said first and second abutment means being disposed for producing a force vector in a direction substantially parallel to said axis.

22. In a fuel dispensing system as recited in claim 21, wherein said first abutment means comprises a pair of flanges disposed about said first body member spaced from said first interlocking member remote from said second interlocking member, said flanges being spaced apart to define a pair of abutment surfaces; said second abutment means comprising a protuberance formed on said second body member spaced from said second interlocking member remote from said first interlocking member and receivable between said abutment surfaces, said protuberance having a first cam surface for abutting one of said abutment surfaces and a second cam surface for abutting the other of said abutment surfaces.

23. In a fuel dispensing system as recited in claim 22, wherein said first and second cam surfaces are disposed in planes inclined relative to said longitudinal axis.

24. In a fuel dispensing system as recited in claim 20, wherein each of said rigid conduit, flexible fuel line, nozzle, first body member, second body member and connecting conduit include a vapor return passageway for returning vapor from said nozzle to said remote location.

25. In a fuel dispensing system as recited in claim 20, wherein said connecting conduit is rotatably connected to said first body member for rotation about a swivel axis passing through said first portal of said first body member, said passageway of said first body member being angularly diverted from the first portal to the second portal of said first body member, and said passageway of said second body member being angularly diverted from the second portal of said second body member to said longitudinal axis.

26. In a fuel dispensing system as recited in claim 25, wherein said interconnectable means comprises a first interlocking member disposed about the second portal of said first body member and a second interlocking member disposed about the second portal of said second body member, an arcuate mortise slot formed in one of said interlocking members and a correspondingly configured arcuate tenon defined in the other of said interlocking members, said tenon being cooperatively received within said mortise when said body members are coupled.

27. In a fuel dispensing system as recited in claim 26, wherein said locking means comprises an annular recess formed in the body member in which said mortise is defined and opening onto said slot, an annular detent ring disposed within said recess, and biasing means within said recess for urging said ring into engagement with said tenon at an angle inclined relatively to said longitudinal axis.

28. In a fuel dispensing system as recited in claim 27, wherein said ring and said tenon have cooperating annular surfaces, and said surfaces are inclined relatively to said longitudinal axis.

29. In a fuel dispensing system as recited in claim 26, wherein said tenon has a circular circumference and said mortise slot has a semi-circular cross sectional configuration.

30. In a fuel dispensing system as recited in claim 29, wherein said first abutment means comprises a pair of flanges disposed about said first body member spaced from said first interlocking member remote from said second interlocking member, said flanges being spaced apart to define a pair of abutment surfaces; said second abutment means comprising a protuberance formed on said second body member spaced from said second interlocking member remote from said first interlocking member and receivable between said abutment surfaces, said protuberance having a first cam surface for abutting one of said abutment surfaces and a second cam surface for abutting the other of said abutment surfaces.

31. In a fuel dispensing system as recited in claim 30, wherein each of said rigid conduit, flexible fuel line, nozzle, first body member, second body member and connecting conduit include a vapor return passageway for returning vapor from said nozzle to said remote location.

32. In a fuel dispensing system as recited in claim 20, wherein said force concentrating means comprises a peripheral notch disposed about said second body member, said notch providing a frangible zone adapted to rupture as a result of said excessive tensile force.

33. In a fuel dispensing system as recited in claim 32, wherein said locking means comprises a frangible breakaway means.

34. In a fuel dispensing system as recited in claim 33, wherein said frangible breakaway comprises at least one shear pin interposed intermediate said first and second body members.

35. In a fuel dispensing system as recited in claim 20, wherein said passageway of said first body member is angularly diverted from said first portal to the second portal of said first body member, and said longitudinal axis passes through said second portal of said first body member.

36. In a fuel dispensing system as recited in claim 35, wherein said force concentrating means comprises a peripheral notch disposed about said second body member, said notch providing a frangible zone adapted to rupture as a result of said excessive tensile force.

37. In a fuel dispensing system as recited in claim 35, wherein said force concentrating means comprises frangible breakaway means for uncoupling said first body member and said connecting conduit, and said valve means includes valving for shutting flow communication between said first body member and said connecting conduit when said first body member and said connecting conduit uncouple.

38. In a fuel dispensing system as recited in claim 37, wherein said means for rotatably connecting said connecting conduit to said first body member comprises a sleeve fastened to one of said connecting conduit and said first body member, and journally connected to the other of said connecting conduit and said first body member, said frangible breakaway means comprising a peripheral notch disposed about the periphery of said sleeve, said notch providing a frangible zone adapted to rupture as a result of said excessive tensile force.

39. In a fuel dispensing system as recited in claim 37, wherein said means for rotatably connecting said connecting conduit to said first body member comprises a sleeve journally connected to one of said connecting conduit and said first body member, and said frangible breakaway means comprises at least one shear pin interposed intermediate said sleeve and the other of said connecting conduit and said first body member.

* * * * *